(12) United States Patent
Moinzadeh et al.

(10) Patent No.: US 8,014,942 B2
(45) Date of Patent: Sep. 6, 2011

(54) REMOTE DESTINATION PROGRAMMING FOR VEHICLE NAVIGATION

(75) Inventors: Kamyar Moinzadeh, Bellevue, WA (US); Leon Hong, Sammamish, WA (US)

(73) Assignee: Airbiquity, Inc., Seattle, WA (US)

( * ) Notice: Subject to any disclaimer, the term of this patent is extended or adjusted under 35 U.S.C. 154(b) by 667 days.

(21) Appl. No.: 12/044,916

(22) Filed: Mar. 7, 2008

(65) Prior Publication Data

US 2008/0195306 A1   Aug. 14, 2008

Related U.S. Application Data

(63) Continuation-in-part of application No. 11/154,145, filed on Jun. 15, 2005, now abandoned.

(51) Int. Cl.
*G01C 21/00* (2006.01)
(52) U.S. Cl. ... 701/201; 701/209; 701/214; 342/357.31; 340/995.18
(58) Field of Classification Search ............... 701/201, 701/207, 208, 209, 211, 214; 342/357.31; 340/995.16, 995.18, 995.19
See application file for complete search history.

(56) References Cited

U.S. PATENT DOCUMENTS

| | | |
|---|---|---|
| 3,971,888 A | 7/1976 | Ching et al. |
| 4,355,510 A | 10/1982 | Ruseff |
| 4,599,583 A | 7/1986 | Shimozono et al. |
| 4,641,323 A | 2/1987 | Tsang |
| 4,651,157 A | 3/1987 | Gray et al. |
| 4,754,255 A | 6/1988 | Sanders et al. |
| 4,941,155 A | 7/1990 | Chuang et al. |
| 5,025,455 A | 6/1991 | Nguyen |
| 5,043,736 A | 8/1991 | Darnell et al. |
| 5,081,667 A | 1/1992 | Drori et al. |
| 5,119,504 A | 6/1992 | Durboraw |
| 5,155,689 A | 10/1992 | Wortham |
| 5,201,071 A | 4/1993 | Webb |
| 5,203,012 A | 4/1993 | Patsiokas et al. |

(Continued)

FOREIGN PATENT DOCUMENTS

EP    0 512 789 A2    11/1992

(Continued)

OTHER PUBLICATIONS

International Searching Authority, International Search Report and Written Opinion, PCT/US09/36201, mail date Apr. 14, 2009.

(Continued)

*Primary Examiner* — Gertrude Arthur Jeanglaud
(74) *Attorney, Agent, or Firm* — Stolowitz Ford Cowger LLP (57) ABSTRACT

Remote destination programming enables a user to define a desired destination (402, 406, 410) in advance of a journey. The destination may be stored in a user profile (502, 504) on a remote navigation server (400, 500). It may be uploaded there via a web interface (402), or through land-line or wireless telecom communications (410). Subsequently, for example beginning at a rental car agency, the navigation server supports navigation through any of several modes of operation, including a first mode in which the desired destination information is downloaded from the server (520) so as to program target navigation equipment (522) on-board the rental vehicle. In another mode, the user's GPS-enabled communication device (428) interacts with the navigation server (500) to upload periodic location data (430), and receive turn-by-turn directions (530) for the user. In this mode, there is no need for separate on-board navigation equipment to assist the user to the desired location.

27 Claims, 5 Drawing Sheets

U.S. PATENT DOCUMENTS

| | | |
|---|---|---|
| 5,212,831 A | 5/1993 | Chuang et al. |
| 5,223,844 A | 6/1993 | Mansell et al. |
| 5,235,633 A | 8/1993 | Dennison et al. |
| 5,282,204 A | 1/1994 | Shpancer et al. |
| 5,301,359 A | 4/1994 | Van Den Heuvel et al. |
| 5,331,635 A | 7/1994 | Ota |
| 5,333,175 A | 7/1994 | Ariyavisitakul et al. |
| 5,334,974 A | 8/1994 | Simms et al. |
| 5,347,272 A | 9/1994 | Ota |
| 5,363,375 A | 11/1994 | Chuang et al. |
| 5,363,376 A | 11/1994 | Chuang et al. |
| 5,365,450 A | 11/1994 | Schuchman et al. |
| 5,388,147 A | 2/1995 | Grimes |
| 5,389,934 A | 2/1995 | Kass |
| 5,408,684 A | 4/1995 | Yunoki et al. |
| 5,410,541 A | 4/1995 | Hotto |
| 5,418,537 A | 5/1995 | Bird |
| 5,422,816 A | 6/1995 | Sprague et al. |
| 5,428,636 A | 6/1995 | Meier |
| 5,475,864 A | 12/1995 | Hamabe |
| 5,475,868 A | 12/1995 | Duque-Anton et al. |
| 5,479,482 A | 12/1995 | Grimes |
| 5,483,549 A | 1/1996 | Weinberg et al. |
| 5,491,690 A | 2/1996 | Alfonsi et al. |
| 5,504,491 A | 4/1996 | Chapman |
| 5,506,888 A | 4/1996 | Hayes et al. |
| 5,515,043 A | 5/1996 | Berard et al. |
| 5,519,403 A | 5/1996 | Bickley et al. |
| 5,530,701 A | 6/1996 | Stillman et al. |
| 5,539,810 A | 7/1996 | Kennedy et al. |
| 5,543,789 A | 8/1996 | Behr et al. |
| 5,544,222 A | 8/1996 | Robinson et al. |
| 5,551,066 A | 8/1996 | Stillman et al. |
| 5,555,286 A | 9/1996 | Tendler |
| 5,555,520 A | 9/1996 | Barzegar et al. |
| 5,557,254 A | 9/1996 | Johnson et al. |
| 5,566,173 A | 10/1996 | Steinbrecher |
| 5,572,204 A | 11/1996 | Timm et al. |
| 5,576,716 A | 11/1996 | Sadler |
| 5,587,715 A | 12/1996 | Lewis |
| 5,712,899 A | 1/1998 | Pace |
| 5,726,893 A | 3/1998 | Schuchman et al. |
| 5,726,984 A | 3/1998 | Kubler et al. |
| 5,752,193 A | 5/1998 | Scholefield et al. |
| 5,752,195 A | 5/1998 | Tsuji et al. |
| 5,771,001 A | 6/1998 | Cobb |
| 5,796,808 A | 8/1998 | Scott et al. |
| 5,812,087 A | 9/1998 | Krasner |
| 5,812,522 A | 9/1998 | Lee et al. |
| RE35,916 E | 10/1998 | Dennison et al. |
| 5,826,188 A | 10/1998 | Tayloe et al. |
| 5,870,675 A | 2/1999 | Tuutijarvi et al. |
| 5,945,944 A | 8/1999 | Krasner |
| 5,946,611 A | 8/1999 | Dennison et al. |
| 5,991,279 A | 11/1999 | Haugli et al. |
| 6,002,363 A | 12/1999 | Krasner |
| 6,014,090 A | 1/2000 | Rosen et al. |
| 6,021,163 A | 2/2000 | Hoshi |
| 6,049,971 A | 4/2000 | Ben-Yehezkel et al. |
| 6,055,434 A | 4/2000 | Seraj |
| 6,122,514 A | 9/2000 | Spaur et al. |
| 6,140,956 A | 10/2000 | Hillman et al. |
| 6,144,336 A | 11/2000 | Preston et al. |
| 6,169,497 B1 | 1/2001 | Robert |
| 6,226,529 B1 | 5/2001 | Bruno et al. |
| 6,320,535 B1 | 11/2001 | Hillman et al. |
| 6,327,533 B1 | 12/2001 | Chou |
| 6,381,535 B1 | 4/2002 | Durocher et al. |
| 6,401,029 B1 | 6/2002 | Kubota et al. |
| 6,493,338 B1 | 12/2002 | Preston et al. |
| 6,522,265 B1 | 2/2003 | Hillman et al. |
| 6,617,979 B2 | 9/2003 | Yoshioka |
| 6,690,681 B1 | 2/2004 | Preston et al. |
| 6,707,421 B1 * | 3/2004 | Drury et al. ............... 342/357.31 |
| 6,728,630 B1 | 4/2004 | Burt et al. |
| 2002/0097706 A1 | 7/2002 | Preston et al. |
| 2003/0219068 A1 | 11/2003 | Smith |
| 2004/0024522 A1 | 2/2004 | Walker et al. |
| 2004/0034529 A1 | 2/2004 | Hooper, III |
| 2005/0033511 A1 | 2/2005 | Pechatnikov et al. |
| 2005/0250534 A1 | 11/2005 | Maurer |
| 2008/0143497 A1 | 6/2008 | Wasson et al. |
| 2009/0079555 A1 | 3/2009 | Aguirre De Carcer |

FOREIGN PATENT DOCUMENTS

| | | | |
|---|---|---|---|
| JP | 2004264224 A | * | 9/2004 |
| WO | WO89/12835 | | 12/1989 |
| WO | WO96/18275 | | 6/1996 |

OTHER PUBLICATIONS

Vocal Technologies, Ltd. Home Page, "Audio Codecs," http://www.vocal.com/data_sheets/audio_codecs.html?glad, accessed Jun. 12, 2005.

* cited by examiner

FIG. 5

REMOTE DESTINATION PROGRAMMING FOR VEHICLE NAVIGATION

RELATED APPLICATIONS

This application is a continuation-in-part of co-pending application Ser. No. 11/154,145 filed Jun. 15, 2005 and incorporated herein in its entirety by this reference. The parent case is entitled, "Concomitant Inband Signaling for Data Communications Over Digital Wireless Telecommunications Network".

COPYRIGHT NOTICE

© 2005-2008 Airbiquity Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to methods and systems related to vehicle navigation, and more specifically to improvements in programming a destination address into a navigation system, especially but not necessarily for use while traveling in a motor vehicle.

BACKGROUND OF THE INVENTION

The Global Positioning System or "GPS" is by definition ubiquitous and is now widely used for a wide variety of military, commercial and consumer applications. GPS is used for everything from missile guidance to guiding a backpacker who has wandered off the Pacific Crest Trail in a surprise Sierra Nevada snowstorm. Details of GPS system operation are published elsewhere. Suffice to say here that the GPS network of satellites provides information to a GPS receiver as long as it is "in view" of a least a handful of the dozen or so GPS satellites positioned in geostationary orbit. The GPS receiver or an associated processor calculates the current location of the receiver from the received information. The resulting location data may be expressed for example as latitude, longitude, altitude or in an equivalent coordinate system.

In recent years, the size and cost of GPS receivers and related equipment have diminished so dramatically so that the technology is now available in packages small enough to hand carry and at pricing levels that bring the equipment into the consumer marketplace. In fact, many mobile phones today include a built-in GPS receiver.

One growing application of GPS receivers is for navigation purposes in motor vehicles. Where a driver is unfamiliar with a desired destination location or the surrounding area, GPS-based navigation equipment can help, as it can determine the location of the vehicle at almost any time. Commercial vehicle applications are growing as well, from local garbage trucks to long-haul rigs.

One vendor of GPS equipment, known as Garmin, recited in a press release: "Thanks to the real-time information transmitted through the GPS-Buddy unit, fleet managers can know where their fleet is and communicate with the drivers 24-hour-a-day, 7-days-a-week . . . . Every 60-seconds, a secured GPS-Buddy server receives information about the vehicle's location, speed, and status—such as engine data, loading door, and thermostat. The information is then available on the internet to GPS-Buddy customers. The data may be viewed at anytime on any device with internet access such as personal computers, Smartphones, or PDAs." In short, it is known to upload location data and other information from a motor vehicle to a server.

While vehicle (or hand carried) navigation systems generally can acquire their present location via GPS, they must in all cases be programmed with a desired destination location (hereafter simply, "destination") before the navigation system can assist in navigating to that location.

Programming a navigation system with a desired destination may be difficult for some users who are unfamiliar with the user interface at hand, and at any rate takes the user's time.

Systems and methods also are known for transmitting digital data over the voice channel of a wireless telecom network. Voice services have the advantages of low cost, high reliability and wide availability across various wireless networks and technologies. These are sometimes called "concierge" services in view of the human contact (via phone) and personalized service. Digital wireless data services by contrast are sometimes unreliable, and can vary in bandwidth, delay and other parameters across different networks and technologies.

Moreover, transmitting data in the voice channel has the characteristic that a voice call connection must be established. This enables substantially simultaneous voice and data communications. Thus, for example, an emergency call taker or concierge operator can talk to a person who requires assistance and, at substantially the same, time receive data such as the person's location or physiological or medical data. Live concierge operators can give verbal "turn-by-turn" driving instructions to guide a user to a desired location while the user is en route, typically by motor vehicle, as long as the vehicle is suitable equipped with integral wireless phone, voice-band or "in-band" signaling modem, etc. . . . Location data can be provided through the voice channel from the car to the concierge or other "call taker." These services are expensive, however, because they are labor intensive. Some users prefer a more independent approach, using on-board electronic navigation equipment.

On-board navigation equipment is now available in some markets and built into some luxury automobiles and rental cars. These on-board navigation devices generally are "stand-alone" meaning that they operate without the assistance of a remote, live operator. They typically have a GPS receiver built into the equipment, or connected to it, to determine a present location of the car. They also have databases (e.g. stored on CD-ROM) with maps or other GIS data to aide navigation, or they can download them as required, for example via the wireless telecommunications network, internet-connected WAP, satellite etc. The stand-alone systems may provide recorded or simulated voice announcement of so-called "turn-by-turn" driving instructions to guide the user to a selected destination. In all cases the desired destination location must be input to the system. Programming a navigation system, i.e., to input the desired destination location, is clumsy and difficult, for example because of a very limited user interface, small display screen, etc. It is especially difficult and may be dangerous to attempt to input a desired destination address to a navigation device while a user is driving.

SUMMARY OF THE INVENTION

Methods and systems are disclosed to improve the convenience of GPS-based navigation, and more specifically to address the challenge of entering a desired destination into a navigation system. Aspects of the invention can be applied to hand-carried portable GPS systems. In other embodiments, aspects of the invention are useful for programming vehicle navigation systems. While aspects of the invention described herein are applicable to various vehicles such as boats, other watercraft, aircraft, etc.), a primary application is motor vehicles.

In one embodiment, a user can define a desired destination using a graphical user interface executing on a PC or other computer-type device. Preferably, the user interface comprises a web page. The user can upload the destination to a remote server, for example before leaving on a trip, and the server will subsequently download the destination data into a selected navigation device, for example one located in a motor vehicle.

In one alternative embodiment, the user inputs destination data and transmits it in an SMS message or other wireless message service to a remote destination programming server. The server, as before, downloads the destination data as and when needed into a selected navigation device, so that the user need not "program" the navigation device himself.

In one preferred embodiment, the user's selected destination data is saved on his user space or profile at the remote server. In this way, the user is relieved of having to program a navigation device "on the spot"—for example when he first embarks in a rental car, perhaps in a dark, unfamiliar parking lot.

In another preferred embodiment, the target navigation device is completely obviated, and the user's communication device becomes the centerpiece of a personal navigation system in addition to its other functions.

Additional aspects and advantages of this invention will be apparent from the following detailed description of preferred embodiments, which proceeds with reference to the accompanying drawings.

DETAILED DESCRIPTION OF PREFERRED EMBODIMENTS

Preliminarily, it should be noted that the drawing figures are not strictly hardware or software diagrams. Rather, most of the elements shown in the figures will involve a combination of hardware and software in a practical implementation. The present invention can be implemented in various combinations of hardware and software, subject to numerous detailed design choices, all of which should be deemed within the scope of the invention.

Figure 1:
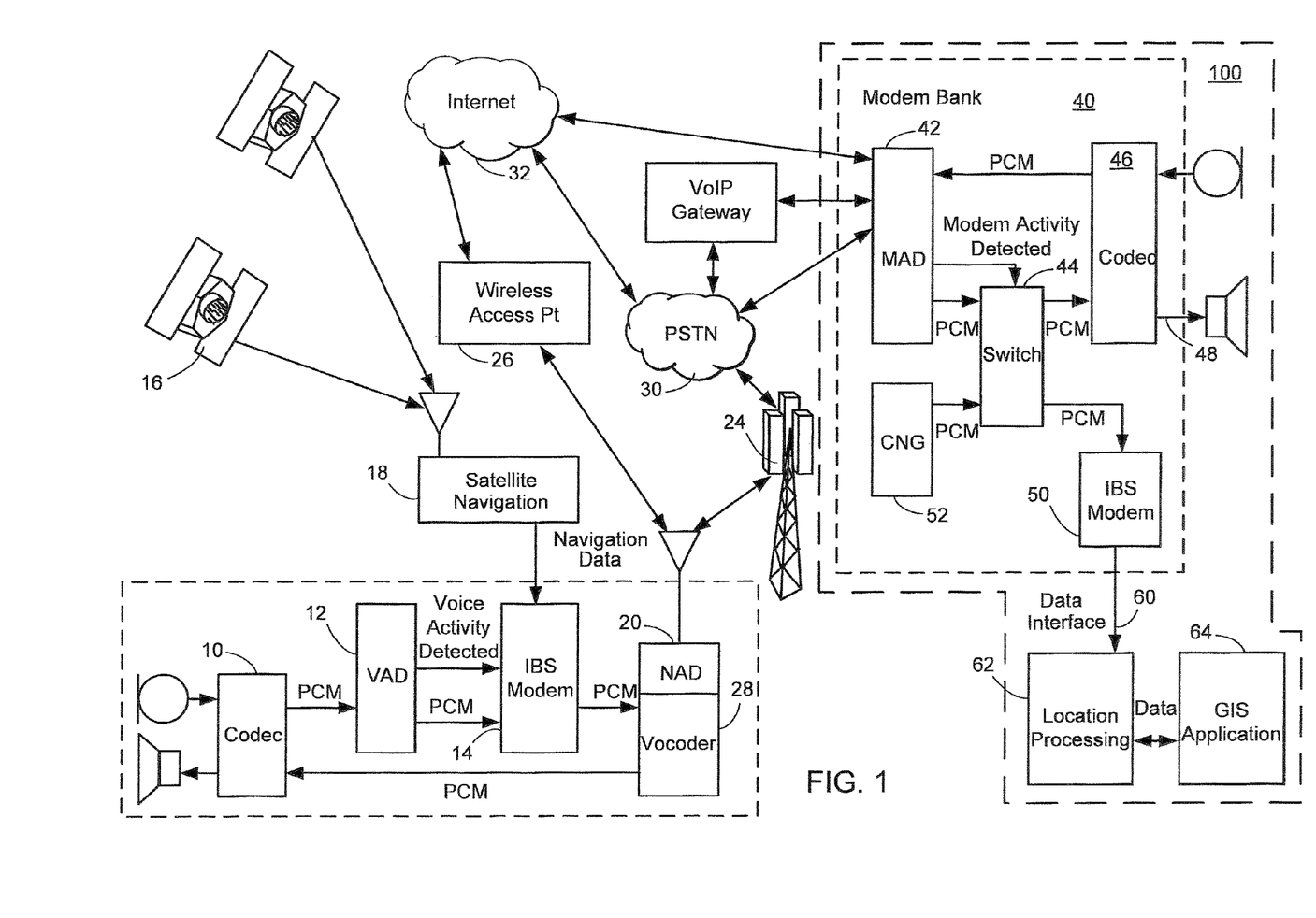
FIG. 1 is a diagram illustrating a wireless telecommunications network that provides concomitant inband signaling from a wireless node to a modem bank at a remote server site.

FIG. 1 illustrates one example a wireless telecommunications network with a concomitant in-band signaling (CIBS) modem transmitting to a modem bank, which may be deployed at a remote server. An analog voice signal is digitized by a coder-decoder (audio codec) 10 using Pulse Code Modulation (PCM) and sent to a Voice Activity Detector (VAD) 12. The VAD algorithm detects the presence of speech in the voice signal and transmits the voice activity status to an IBS (In-band signaling) modem 14. In-band signaling modems are described in detail in U.S. Pat. No. 6,493,338 incorporated herein by this reference. Broadcasts from a plurality of Global Positioning System (GPS) satellites 16, Global Orbiting Navigation Satellite System (GLONASS) satellites, and or GALILEO satellites are received by a GPS receiver 18 and processed into navigation data. Periodically, the navigation data is transmitted from the satellite navigation receiver to the IBS modem 14. If the VAD determines that silence or noise is present in the voice signal and digital data to be transmitted exists, the IBS modem encodes the navigation data into synthesized audio tones to be passed to a Network Access Device (NAD) 20. If speech is present, the IBS modem passes the unmodified voice signal to the NAD.

The NAD either communicates to a wireless telecommunications network 24 as a circuit switched call or to a wireless internet access point 26 as an Internet Protocol (IP) packet switched Voice Over Wireless LAN (VoWLAN) call. The digital wireless telecommunications network and the wireless internet access point require that the audio PCM signal be processed by a voice coder (vocoder) 28 to reduce the bandwidth required for transmission. The vocoder compresses the information associated with human speech by using predictive coding techniques. The call can be routed from the Public Switched Telephone Network (PSTN) 30 to the IP network 32 or vice versa.

The call is received at a remote server site that includes a modem bank 40 and detected by a Modem Activity Detector (MAD) 42. The MAD 42 processes the incoming PCM audio and detects the presence of synthesized audio tones through an algorithm analyzing signal energy and frequency content. If the MAD determines that synthesized tones are not present, the modem activity status is used to control a telephony switch 44 to route the audio to a codec 46 for transformation to an analog voice signal 48. If the MAD 42 detects synthesized audio tones, the modem activity status is used to route the audio through the telephony switch 44 to an IBS modem 50. Simultaneously, audio noise from a Comfort Noise Generator (CNG) 52 is routed by the telephony switch 44 to the codec 46.

The IBS modem 50 decodes the synthesized audio tones into digital navigation data. The navigation data 60 is passed to a location processing algorithm 62 that filters and validates the incoming data based on past samples of a multiplicity of navigation information types including for example timestamp, location, ground speed, and ground track angle. The navigation data is then output to a Geographic Information System (GIS) application for reverse geocoding. At this point, the received location information has been recovered at the remote server.

Figure 2:
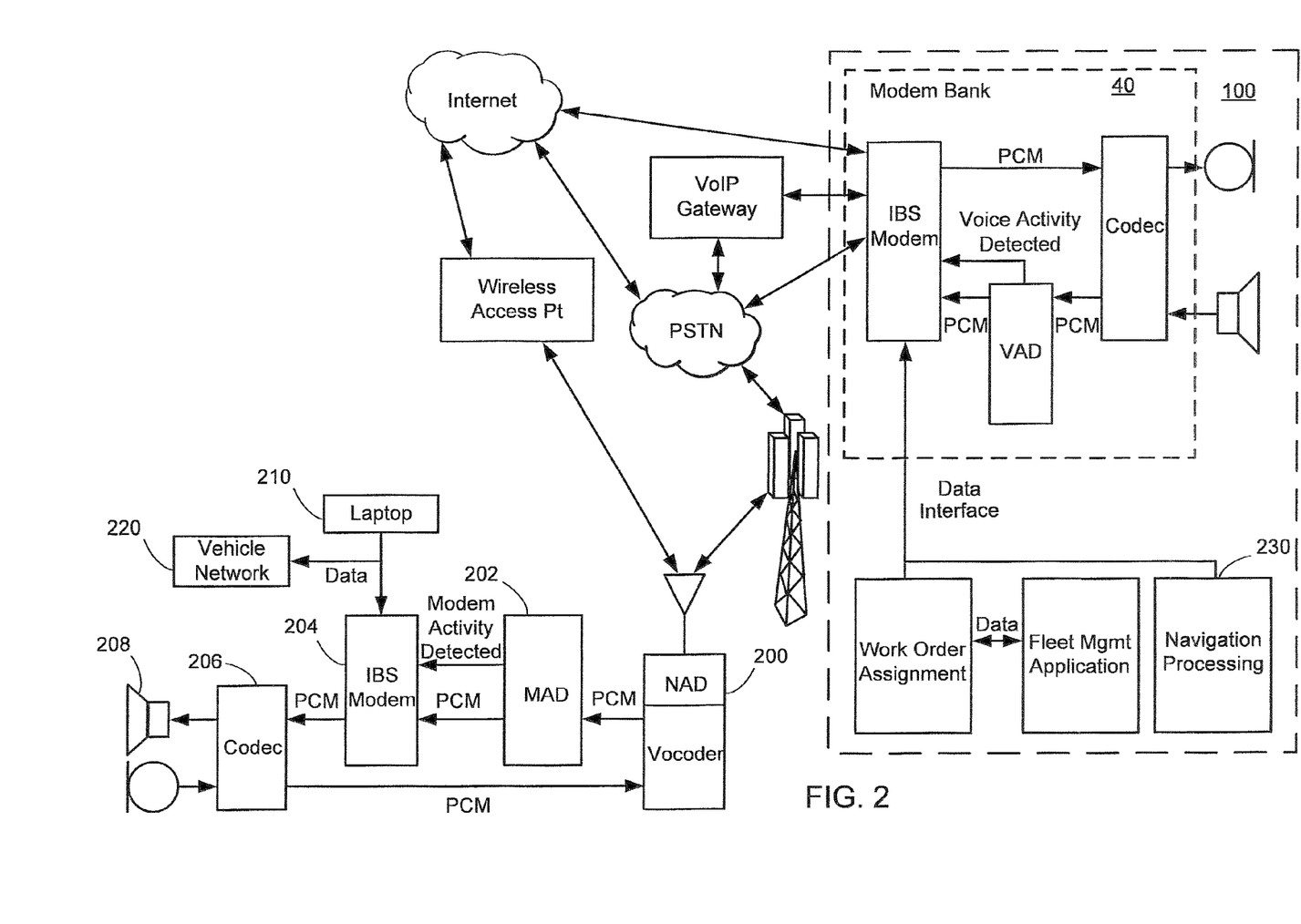
FIG. 2 is a diagram illustrating concomitant inband signaling from a modem bank at a remote site to a wireless node.

FIG. 2 is similar in some respects to FIG. 1 and description of the common elements is not repeated. FIG. 2 shows an instance of the CIBS modem within a modem bank transmitting to a wireless node. In a similar manner to FIG. 1, an analog voice signal is digitized by a codec and sent to a VAD using PCM. The VAD speech detection algorithm indicates the presence of speech to the IBS modem and if speech is present, the unmodified voice signal is passed to the telecommunications network as a circuit switched call or as a series of IP packets in a Voice Over IP (VoIP) call. If the VAD determines that speech is not present and digital data from another application, such as a fleet management application, is to be transmitted, the IBS modem encodes the digital data into synthesized audio tones for transmission over the telecommunications network.

The NAD 200 in this example receives the call where the vocoder reconstitutes the coded voice signal into an audio PCM signal. The PCM audio is processed by MAD 202 that detects the synthesized audio tones from the modem bank and provides the modem activity status to an IBS modem 204. If the MAD 202 indicates that synthesized tones are not present, the IBS modem forwards the PCM audio to the codec 206 for conversion to an analog signal that can be played over a speaker 208. If synthesized tones representing non-voice data are present, the IBS modem 204 mutes the incoming audio by sending PCM audio that represents silence to the codec 206. The IBS modem then decodes the tones into the digital data, which was sent by an application at the remote server site 100, for example a navigation application 230. This data can be sent to a mobile computing platform, such as a laptop computer 210, or in the case of a motor vehicle, to a vehicle network 220.

Figure 3:
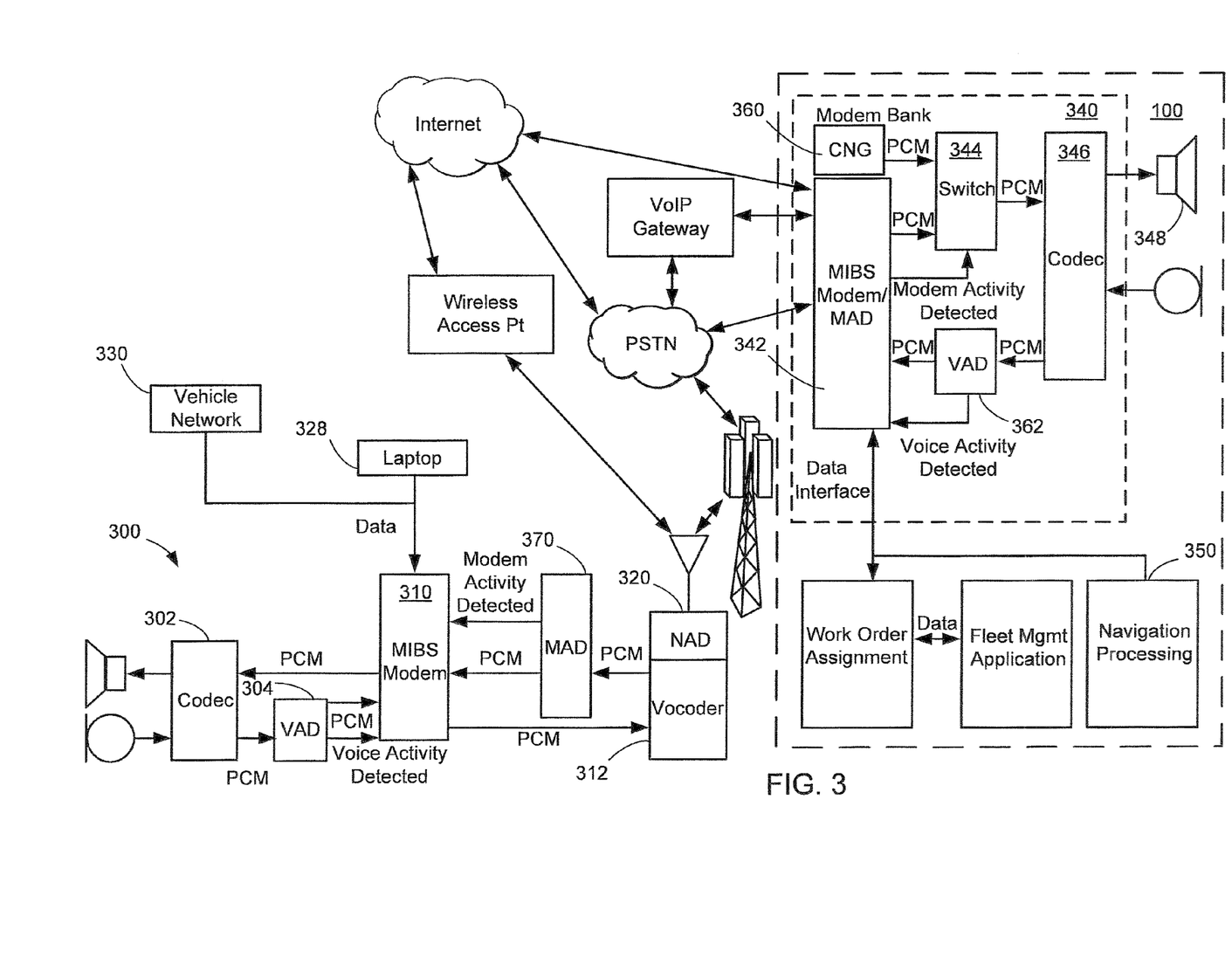
FIG. 3 is a diagram illustrating bidirectional concomitant inband signaling between a wireless node and a modem bank according to another embodiment of the invention.

FIG. 3 includes some of the elements present in FIGS. 1 and 2. It illustrates one example of a system for digital data, including location data, to be transmitted bidirectionally by using Multichannel Inband Signaling (MIBS) modems. By using a first pair of frequencies to modulate digital data to be transmitted in one channel and using a second pair of frequencies to modulate digital data to be transmitted in the opposite direction in another channel, a full-duplex communication link can be established between the modem bank and the wireless node.

For digital data to be transmitted from the wireless node 300 to the modem bank 340, the codec 302 digitizes an analog voice signal into PCM audio. The VAD 304 determines if speech is present in the PCM audio and passes the voice activity status to the MIBS modem 310. If speech is present, the MIBS modem passes it to the vocoder 312. Otherwise, it modulates the digital data received from the mobile computing platform into synthesized audio tones and passes them to the vocoder for transmission over the telecommunications network via the NAD 320. Here, the "mobile computing platform" is used in a broad sense, including but not limited a laptop computer 328 or a vehicle network 330.

The modem bank 340 receives the call from the wireless node 300 and routes the audio to a combined MAD/MIBS modem 342. The MAD determines if modem activity is present and passes the status to a switch 344. If modem activity is not present, the audio PCM is routed to the codec 346 for conversion to an analog audio signal that may be played on a speaker 348. (The speaker and microphone may be obviated in the case of an automated or unattended remote server.) If synthesized audio tones are present, the MIBS modem demodulates the digital data and passes it to the destination application, for example a navigation application 350. The switch 344 receives status that modem activity is present and passes PCM audio from a CNG 360 to the codec 346 for conversion to an analog signal to be played on the speaker 348 in implementations where a speaker is used.

For digital data to be transmitted from the modem bank 340 to the wireless node 300, the VAD 362 analyzes the PCM audio from the codec 346 that represents the analog voice signal and generates a voice activity status signal. If speech is present, the combined MAD/MIBS modem 342 forwards the PCM audio to the telecommunications network (PSTN, wireless, internet) without alteration. Otherwise, the MIBS modem 342 modulates the digital data received from the application using a set of synthesized audio tones that are different from those generated by the MIBS modem 310 in the wireless node. These synthesized audio tones are transmitted over the telecommunications network over a plurality of networks such as the PSTN, the internet using VOIP and local area networks using VoWLAN.

The NAD 320 receives the audio from the telecommunications network and forwards it to the vocoder 312 which reconstitutes the signal into audio PCM. The audio PCM is analyzed by a MAD 370 that provides status to the MIBS modem 310 that synthesized tones are present. If synthesized tones are not present, the PCM audio is passed to the codec 302 without change and converted to an analog signal for playing on a speaker. Otherwise, the MIBS modem 310 passes PCM audio that represents silence to the codec 302, resulting in silence being reproduced at the speaker. The "speaker" as used herein refers to any means for audio reproduction. For example, it may take the form of an earphone or headset connected to a cell phone or other PDA. Such a connection may be short-range wireless connection. In some implementations, for example in a vehicle network, the speaker may be part of the on-board audio entertainment system. The MIBS modem demodulates the audio based on the second set of synthesized audio tone frequencies and passes the digital data to the mobile computing platform.

Figure 4:
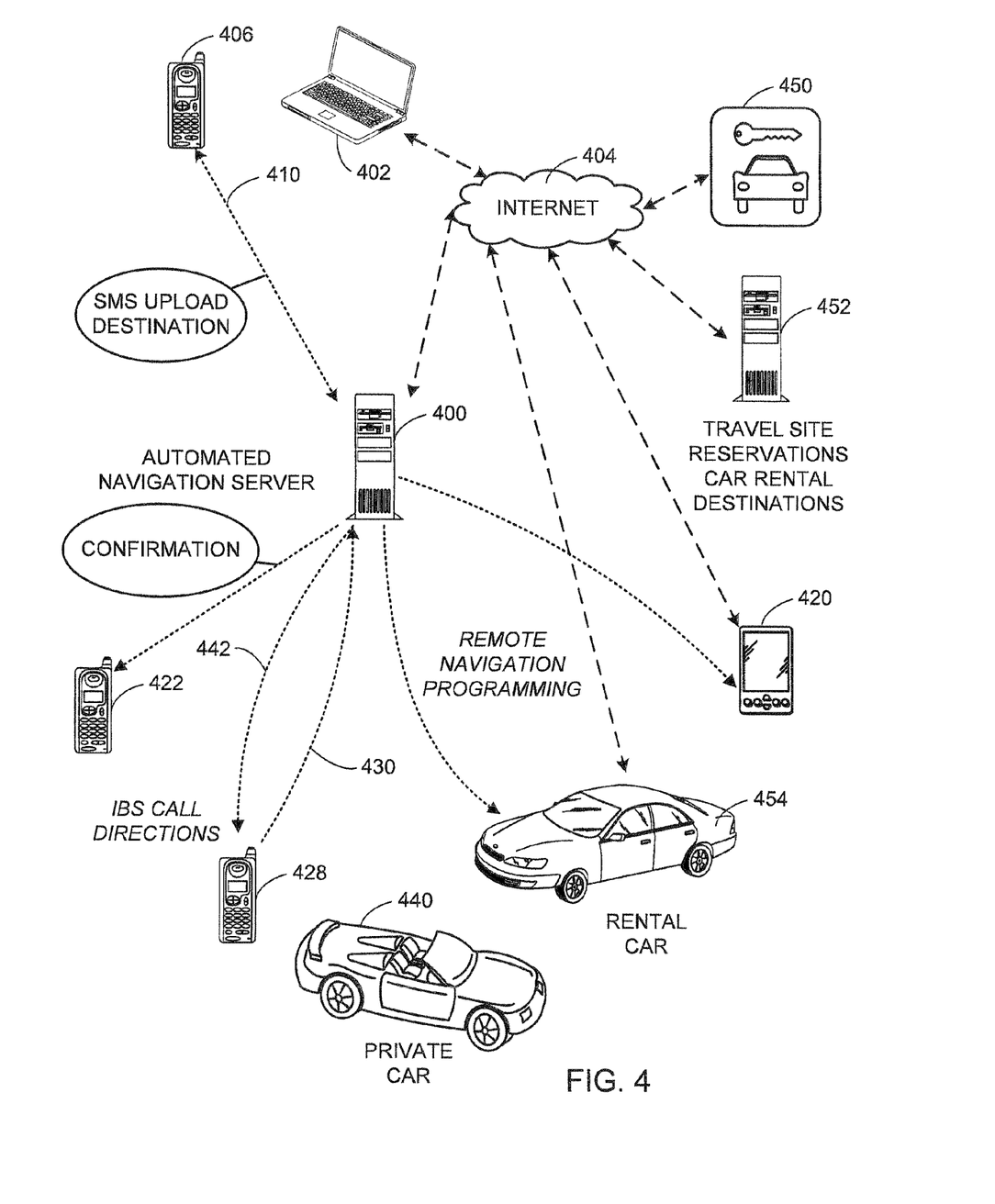
FIG. 4 is a simplified diagram illustrating various communications between users, vehicles, and a remote navigation server via various communications channels to implement several different embodiments of remote destination programming and related operations.

FIG. 4 is a simplified communications diagram illustrating several different embodiments all within the scope of the present invention. The figure is a composite illustration showing various aspects of different implementations; a useful embodiment need not include all the elements shown in FIG. 4. In FIG. 4, details of telecommunications connections (wireless, land-line) are omitted to avoid obscuring the drawing.

A "communication device" in the present application refers to a portable or mobile wireless electronic communication device; that is, a contrivance capable of communication (of voice and or data) over a wireless telecommunications network. Such a device may be hand-held, or built into a vehicle, such as a car or truck. The phrase "GPS-enabled" refers to the Global Positioning System and means that the communication device is capable of acquiring location information by use of the GPS system. Toward that end, a GPS receiver may be built into or coupled to the communication device. Here, "coupled to" means any temporary or permanent connection that enables transfer of acquired location information from the GPS receiver to the communication device. That transfer may be via a direct connection or via a local network, e.g. an on-board vehicle network. The connection may be wired or wireless. (In the latter case, this short-range wireless connection is not to be confused with the longer range wireless telecommunications network connection.) Such devices include but are not limited to, for example, a cell phone, suitably equipped PDA, or a Blackberry® cellphone/PDA.

In FIG. 4, in general, a remote navigation server 400 provides navigation assistance to mobile users, for example by sending updated instructions for guiding the user to a predetermined or desired destination location. The mobile user may be on foot or bicycle, in a boat or other vehicle, etc. First, before discussing updated navigation instructions, we describe how a user can input or select a desired destination location even before departing on his journey.

In one embodiment, a desired destination is selected by remote navigation programming. In this embodiment, the navigation server 400 maintains a database of users, each user having associated profile information. The usual web site login and other security and privacy aspects may be deployed.

For example, it would be important that a person's itinerary away from home not be made public. The user can register with the navigation site at any time, preferably before commencing a trip. This can be done, for example, from a home or office computer 402, via the Internet 404. Various personal profile information, for example contact information (further discussed below) can be entered as and when convenient, and stored in the corresponding user profile.

One way to store a destination location is to store it in the user's profile for later use. One or more destinations can be uploaded from the computer 402 as noted. They may be sent from a communication device such as a cell phone 406 via the wireless telecommunications network (see FIGS. 1-3). This can be done using in-band or any of various text messaging or other data services such as SMS, as indicated at 410 in the drawing. In another embodiment (not shown), a simple telephone call can be made, via wireless or PSTN, to the navigation server site (100) and a predetermined destination (stored in the user's profile) can be selected, by means of operator-attended or, preferably, an automated interactive telephone service, details of which are known.

Referring again to FIG. 4, a PDA 420 may be used for communicating with the navigation server 400. This may be done using wireless telecom network, via the Internet 404 or a PSTN line coupled to the server 400. The PDA 420 can be used for any or all of the functions including: navigation account/profile setup, uploading a desired destination, receiving a confirmation message, etc. If the PDA has GPS capability, it can also provide current location data to the navigation server while the user is en route to a desired destination. FIG. 4 also shows a second cell phone 422 which can be used to receive a confirmation message from the server 400. The server will send confirmations, e.g. confirming a destination selection, to the requesting phone 406, or to a different phone 422 or PDA 420, depending upon the preferences stored in the user's profile. To illustrate, a user might send a destination selection from his personal cell phone or other communication device before leaving the office. But, he may prefer to receive the confirmation on his car phone, or have it sent to his spouse or secretary.

To summarize, a user's desired destination location can be uploaded and stored, either during or prior to a journey, using almost any available means of communication to the navigation server. The user need not have any special equipment for this task. The specialized equipment, such as a GPS receiver, comes into play later, for example when the user picks up a rental car.

Referring once again to FIG. 4, yet another cell phone 428 is shown. This phone (which may be the same phone as 406 or 422 depending on the situation), is GPS-enabled and has an in-band signaling modem (IBS) built in. Accordingly, it can upload current location data as indicated by dashed line 430 to the server 400. This location update can be "pushed" by the unit 428 or requested ("pulled") by the server 400, under software control. In-band signaling, rather than a data service, is used because of its high reliability and near-ubiquitous availability. More detail of in-band signaling can be found in U.S. Pat. No. 6,681,121 incorporated herein by this reference.

The navigation server 400, based on the uploaded current location and the desired destination location, determines an instruction to advance the user generally toward the desired destination location. These are called "turn by turn" instructions. The instructions may be downloaded to the user's device using the IBS, as indicated at 442. They may be presented by visual display and or audio speech, preferably synthesized speech. If the user is traveling by private car 440, and has the portable device 428 on board, there is no need for other navigation devices to assist the user in reaching the desired destination. Turn by turn directions are generated and communicated by the server 400 as required. Updated location data is uploaded to the server, new instructions are provided, and this loop process repeated until terminated.

In some embodiments, a cell phone may be integrated into a motor vehicle, so it is already present. A GPS receiver also may be built into a motor vehicle, either separately or as part of a cell phone. Indeed, these functional units may be deployed in various topologies as part of one or more on-board motor vehicle networks; they may not have separate packaging as in hand-held models. For example, audio and visual display functions may be integrated into the vehicle entertainment systems. If the vehicle also has an in-band signaling modem, which may be implemented in software, the navigation process described above can be used, again obviating any separate or dedicated navigation equipment.

Rental Car Applications

In one embodiment, a user's desired destination information can be downloaded by first downloading it to the user's cell phone, or other portable wireless communication device. From there, it may be further downloaded into a target navigation device, such as an on-board navigation system in a vehicle. The target navigation device need not belong to the user. In one application, the target navigation device is provided by a car rental agency. In one alternative, the target navigation device is a portable model provided, usually as an extra-cost option, by the rental agency. It may be rented from a third party unrelated to the car rental agency. In another scenario, the navigation device is built into a rental vehicle 454, either in OEM or after-market applications. Programming is further discussed below.

Figure 5:
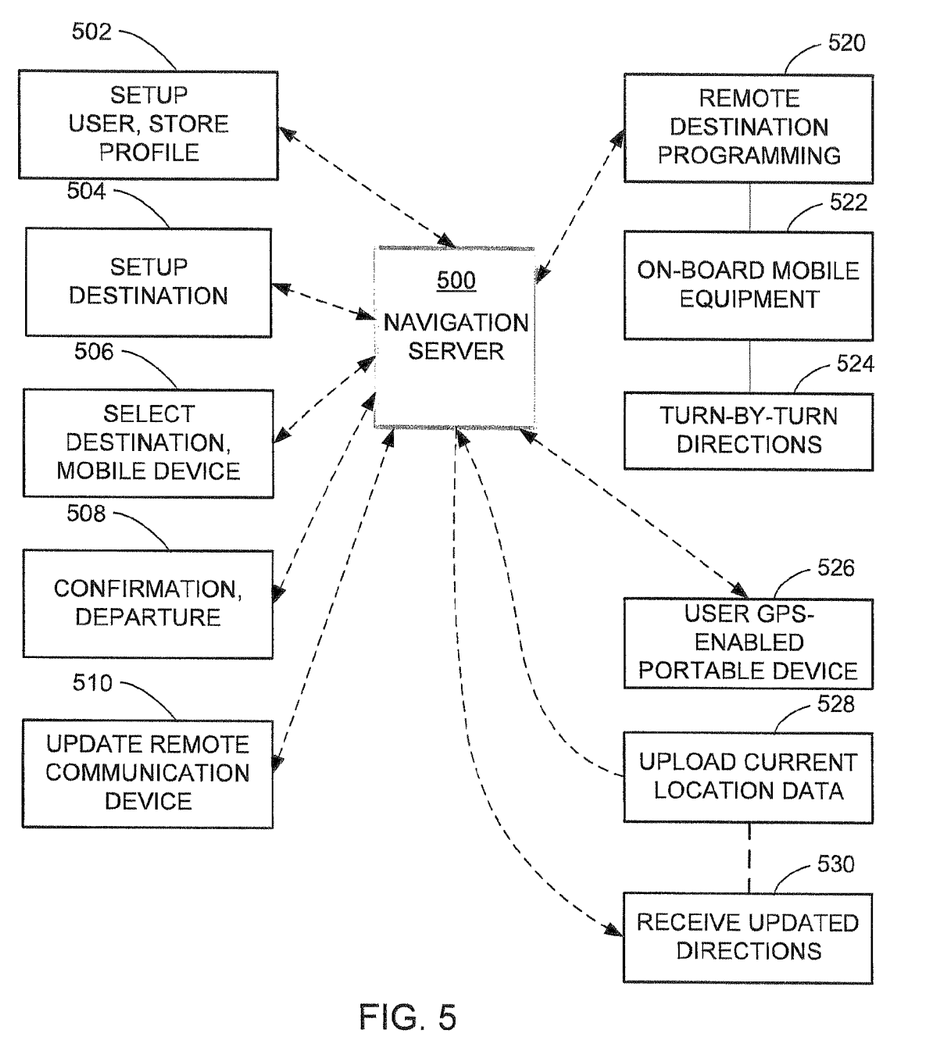
FIG. 5 is another simplified illustration of various functions and operations among illustrative embodiments of aspects of the present invention.

FIG. 5 is a simplified diagram summarizing the functionality of several alternative embodiments of certain aspects of the invention. (Again, details of telecommunications systems are omitted.) The left side of the drawing summarizes some of the contemplated interactions between a user and a navigation server 500. Initial user setup and profile storage 502 can be accomplished in various ways, preferably using a client application and the Internet. In this case, the navigation server includes or is associated with a web site. Second, the user can set up and store in his profile one or more desired destinations, step 504. This can be done within step 502, or subsequently, using any suitable communications device, including an ordinary cell phone or land line telephone, as mentioned earlier. In step 506, the user selects one of the stored destinations for use. This step as well can be done using any suitable communications device. In addition to selecting a desired destination for an upcoming trip, the user may select a pre-stored mobile device identifier (number) for confirmation, or enter a new number to receive confirmation of the destination selection and subsequent messages from the server. Finally, at 510, the user may update identification of a mobile device for subsequent communications. For example, the user may be traveling to a remote country where he will rent a mobile telephone. he can update this contact information when the new mobile number becomes available. Any of the items in 502, 504 and 506 can be updated as needed.

On the upper right portion of FIG. 5, the scenario is shown in which the navigation server 500 downloads (i.e., remotely programs) 520 the desired destination (selected in 506) directly into on-board mobile navigation equipment 522, for example in a rental vehicle. Then, the on-board equipment, also called a "target device," provides turn-by-turn directions 524 without further support from the server 500. In the event that equipment fails, however, the user may employ an alternative strategy, described next. Or, where on-board equipment is not offered, or is too expensive, the user proceeds as follows.

In step 526, the user carries his GPS-enabled portable communication device with him, for example into a rental car or loaner. Again, the desired destination is already stored at the server. When ready to go, the user places a call to the server via a predetermined number. He may enter a login id and or password, and may enter a destination or trip identifier to begin navigation. Preferably, the call-taker process at the server side is automated as mentioned above. Current location data is uploaded 528 as discussed earlier to the server. The server 500 returns updated directions, step 530, and the loop continues as needed to guide the user to the desired destination.

It will be obvious to those having skill in the art that many changes may be made to the details of the above-described embodiments without departing from the underlying principles of the invention. The scope of the present invention should, therefore, be determined only by the following claims.

The invention claimed is:

1. A navigation server implemented as a collection of executable computer code components stored in machine-readable media and accessible for execution on a server hardware system, a navigation server code components comprising:
   a first communication process for uploading and associating destination data with a stored profile of a user, wherein the destination data defines a desired location to which the user would travel;
   the communication process further adapted to upload and associate target device data with the user profile, wherein the target device data identifies a target GPS-enabled navigation device; and
   a second communication process for downloading destination information from the navigation server using in-band signaling, wherein the destination information is for programming the target device with the destination data, wherein the in-band signaling is communicated over a voice channel connection of a wireless telecommunications network.

2. A navigation server according to claim 1 wherein the in-band signaling is communicated via an in-band signaling modem for communicating data through the voice channel connection of the wireless telecommunications network.

3. A navigation server according to claim 1 wherein the first communication process for uploading destination data includes receiving the destination data from a communication device that is different from the target device.

4. A navigation server according to claim 1 wherein the destination data is uploaded via in-band signaling.

5. A navigation server according to claim 1 wherein the second communication process for downloading programming information includes communicating with the target device by first downloading the programming information to a selected communication device that is configured to communicate with the target device, responsive to which the selected communication device passes the programming information on to the target device to remotely program the target device.

6. A navigation server according to claim 5 wherein the selected communication device communicates with the target device via a short-range wireless connection.

7. A computer-implemented method for personal navigation comprising:
   in a navigation server, establishing a user profile to assist the user in future travel in a vehicle;
   in a web application for executing on the navigation server:
      receiving destination data that identifies a destination location;
      storing the destination location data in association with the user profile and generating destination programming data based on the destination data;
      receiving communication device data to identify a selected communication device, wherein the selected device is for remotely programming a target navigation device with the destination data;
   storing the communication device data in association with the user profile, said stored destination location data including an identifier for sending information from the web server to the selected communication device;
   receiving a remote programming request that includes indicia for associating the programming request with the user profile;
   responsive to the programming request, accessing a corresponding user profile data, and downloading the destination programming data to the selected communication device via in-band signaling, wherein the in-band signaling is communicated over a voice channel connection of a wireless telecommunications network, wherein the destination programming data is to be communicated to the target navigation device via the selected communication device.

8. A computer-implemented method according to claim 7 wherein the user enters profile information, and the destination location data, via a web interface.

9. A computer-implemented method according to claim 7 wherein the in-band signaling is communicated via an in-band signaling modem.

10. A computer-implemented method according to claim 7 wherein the destination data is received from a remote device that is different from the selected communication device and from the target navigation device.

11. A computer-implemented method according to claim 9 wherein the destination data is received via in-band signaling and wherein the in-band signaling modem is configured for bidirectional communication.

12. A computer-implemented method according to claim 7 wherein the destination data is received via a voice call, text message, or telecommunications data service.

13. A computer-implemented method according to claim 7 and further comprising sending a confirmation message from the web server to a communication device specified in the user profile to acknowledge receipt of destination location data.

14. A computer-implemented method according to claim 7 wherein the target navigation device is installed in a vehicle.

15. A computer-implemented method according to claim 7 wherein the selected communication device communicates with the target device via a short-range wireless connection.

16. A computer-implemented method according to claim 7 wherein the target navigation device is installed in a rental vehicle.

17. A computer-implemented method for navigation in a rental vehicle comprising:
   in a web server, establishing a user profile to assist a user in future travel in a rental vehicle;
   receiving data that identifies a destination location;
   storing the destination location data in association with the user profile for later use;
   generating destination programming data responsive to receiving the destination location data receiving a link to a rental vehicle reservation;
receiving a remote destination programming request;
responsive to the remote destination programming request, establishing a communication session with a target navigation device or a selected mobile communication device wherein the target navigation device is located in a rental vehicle associated with the said rental vehicle reservation; and
downloading the stored destination location programming data to the selected mobile communication device or the target navigation device via in-band signaling to remotely program the target navigation device in the rental vehicle with the user's destination location.

18. A computer-implemented method according to claim 17 and further comprising:
receiving information from the user to identify the selected mobile communication device;
storing identification of the selected mobile communication device in association with the user's profile and in a manner accessible to the web server, said stored destination location data including a telephone number or other identifier for sending information to the selected mobile communication device; and
sending a confirmation message from the web server to the selected mobile communication device.

19. A computer-implemented method according to claim 18 wherein the selected mobile communication device the first wireless communication device comprises a cell phone or PDA.

20. A computer-implemented method according to claim 18 wherein the confirmation message is to confirm receipt of one of a location destination, a rental car reservation link, and a remote programming request.

21. A computer-implemented method for personal navigation comprising:
sending destination data indicating a desired destination location to a navigation server via in-band signaling, for destination programming, wherein the destination data corresponds to a user profile stored on the navigation server; and
responsive to sending the destination data, receiving destination programming information from the navigation server via in-band signaling, wherein the in-band signaling is communicated over a voice channel connection of a wireless telecommunications network.

22. A computer-implemented method according to claim 21 wherein the destination programming information is for programming a target GPS-enabled navigation device with the destination data; and sending the destination programming to the target GPS-enabled navigation device.

23. A computer-implemented method according to claim 22 wherein the destination programming information is sent to the target GPS-enabled navigation device using in-band signaling.

24. A computer-implemented method according to claim 21 wherein the destination programming information includes one or more instructions directing a user generally toward the desired destination location.

25. A computer-implemented method according to claim 24 wherein the one or more instructions are presented by visual display or audio speech, or combinations thereof.

26. A computer-implemented method according to claim 22 wherein the destination programming information includes one or more instructions directing a user generally toward the desired destination location and wherein the one or more instructions are presented on the target device by visual display or audio speech, or combinations thereof.

27. A computer-implemented method according to claim 22 wherein the destination programming information is communicated to the target device via a short-range wireless connection.

\* \* \* \* \*